No. 750,995. PATENTED FEB. 2, 1904.
E. A. NELSON.
POWER TRANSMISSION MECHANISM.
APPLICATION FILED SEPT. 2, 1902.
NO MODEL.
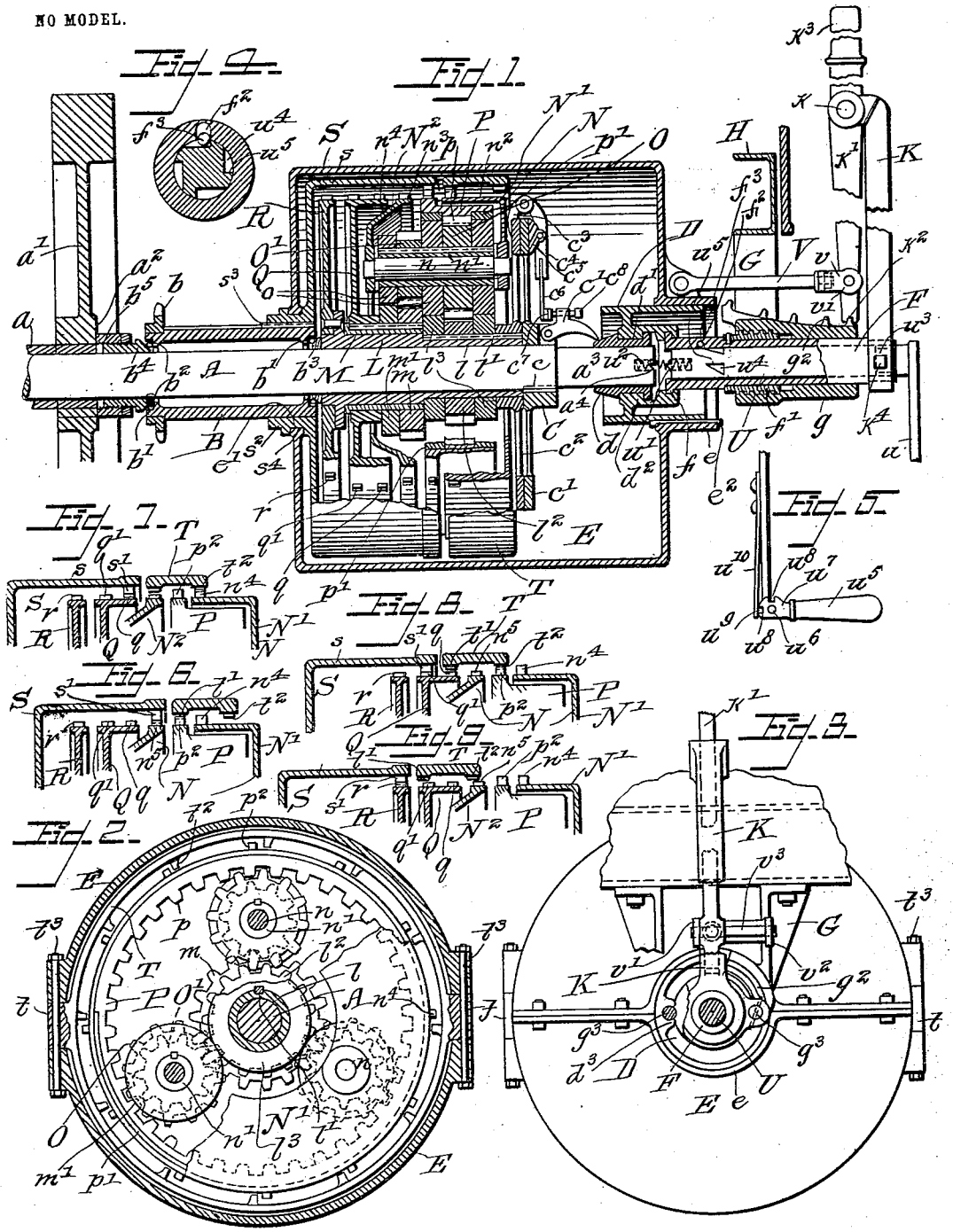
WITNESSES:
E. L. Pardee
H. C. Stone
INVENTOR.
Emil A. Nelson
BY F. D. Ammen
His ATTORNEY.

No. 750,995. Patented February 2, 1904.

UNITED STATES PATENT OFFICE.

EMIL A. NELSON, OF CLEVELAND, OHIO.

POWER-TRANSMISSION MECHANISM.

SPECIFICATION forming part of Letters Patent No. 750,995, dated February 2, 1904.

Application filed September 2, 1902. Serial No. 121,791. (No model.)

*To all whom it may concern:*

Be it known that I, EMIL A. NELSON, a citizen of the United States, residing at Cleveland, in the county of Cuyahoga and State of Ohio, have invented certain new and useful Improvements in Power-Transmission Mechanism, of which the following is a specification, reference being had therein to the accompanying drawings.

My invention relates to power-transmission mechanism, and is especially adapted for use in this connection with automobiles.

A principal object is to provide a simple mechanism of this kind which will admit of several different speeds, proper provision being made for reversing the same. In its general construction this mechanism may be said to comprise a plurality of movable wheels constituting, as it were, a system, each member of which moves with a definite relation to the other members of the system, means being provided for arresting or holding certain of the parts fixed. Motion is then transmitted by the moving parts, differing in its speed and character according to which member is fixed and to which member is transmitting the driving force from the mechanism.

The invention consists in a certain construction and combination of parts, to be more fully described hereinafter and definitely set forth in the claims.

In the drawings, which fully illustrate my invention, Figure 1 represents the same in longitudinal vertical section. Fig. 2 represents a broken section taken substantially at right angles to the driving-shaft. Fig. 3 represents the mechanism in end elevation, certain parts being broken away for the sake of clearness, as will be readily understood. Fig. 4 represents a cross-section of the driving-shaft at a particular point and setting forth in detail a feature of this invention. Fig. 5 represents a portion of the starting-handle which should be used when my invention is employed in connection with explosion-engines. Figs. 6, 7, 8, and 9 represent, respectively, a small portion of the driving mechanism, indicating the different positions which this mechanism assumes for driving the vehicle at its different speeds.

Before proceeding to a detailed description of the parts of my invention it may be well to say that in its general construction its preferred form comprises one or more central gears meshing with certain planetary gears, which latter gears on their outer sides mesh with a larger gear arranged concentrically with the central gear, the planetary gears being themselves carried upon a rotatable frame or wheel and the large inclosing gear, referred to above, being itself rotatable upon the same axis it will appear that a different character of motion would be produced according to the state of rest or motion of these parts relative to each other. In other words, by holding certain of these parts fixed and driving the vehicle from a corresponding member which is allowed to move the character of the motion transmitted will be changed.

Referring to the parts by letters, A represents a shaft projecting from the crank-shaft $a$ of an engine, to which it is rigidly secured. Upon the crank-shaft $a$ is mounted a suitable fly-wheel $a'$. A sleeve B, upon which is rigidly secured a sprocket-wheel $b$, is adapted to drive the vehicle with a sprocket-chain in a common manner. This sleeve B is provided at its extremity, as indicated, with raceways $b'$, which receive balls $b^2$, retained therein by the cones $b^3$ $b^4$, placed upon the shaft A, arrangement being made for tightening the same consisting of two spanner-nuts $b^5$, which thrust against the face $a^2$ of the hub of the fly-wheel. The shaft A has rigidly mounted upon it by means of the key $c$ a clutch member C, which consists, substantially, of a disk or wheel having a rim or rubbing face $c'$, to the hub of which member are pivoted dogs $c'$, preferably three in number, which are adapted to coöperate with other parts to close or operate the clutch. This clutch is formed by the coöperation of a second clutch member $c^2$ with the first member C, the member $c^2$ being provided at points about its periphery with lugs $c^3$, preferably three in number, to which are pivoted short arms $c^4$. To these arms pivotally-mounted shoes $c^5$ are attached, which are adapted to press the rim $c'$ of the aforesaid clutch member C. These members $c^4$ are preferably bifurcated at their extremities, as indicated, to receive a leaf or arm $c^6$ of resilient material, that projects radially inward, as stated. There are preferably three of these, and the inner extremity of the arms or leaves $c^6$ are united by a continuous band or annular rim $c^7$, against which the tips of adjusting-screws $c^8$ abut, which adjusting-screws are carried by the aforesaid dogs $c'$. They afford means for adjusting the dogs so that they will coöperate with nicety with a cone $d$. This cone $d$ is preferably provided with a circumferential recess or groove $d'$, and it is rotatably mounted in the hub $d^2$ of the sleeve D, which sleeve is slidably mounted within an axially-arranged cylindrical wall or flange $e$, which forms an integral part of the gear-case E.

Proceeding now to a description of the mechanism for thrusting the cone $d$ toward the clutch, it will be observed that a hollow spindle F is provided, the inner extremity of which comprises an annular shoulder or collar $f$, which is received by the hub $d^2$ of the aforesaid sleeve D, so that any longitudinal movement of this spindle F would bring about a corresponding movement of the sleeve D. Upon this hollow spindle F is mounted a nut $f'$, which is rigidly secured thereto, and this nut engages with a threaded opening in the hub $g$ of the bracket G, which bracket may be secured to the frame H of the vehicle. At its extremity the spindle F carries rigidly an arm K. Now it will appear that a movement of the arm K, so as to rotate the hollow spindle F, would advance the nut $f'$ and bring about the opening or closing of the clutch. The manner of operating this arm will be described more in detail hereinafter. This much of the description has had to do with the clutch mechanism simply for connecting or disconnecting the driving mechanism, a construction for this purpose being usually employed in connection with gears of this general character.

Proceeding now to a description of the mechanism for effecting the change of speed, it should appear that the shaft A is provided with a sleeve L, having a reduced portion $l$, to which are rigidly secured, by means of the key $l'$, the aforesaid clutch member $c^2$, together with a pinion or gear $l^2$, and on each side of the pinion $l^2$ is mounted a friction-roller $l^3$. These rollers are also rigid upon the sleeve and are for a purpose which will appear hereinafter. The unreduced portion of the sleeve L is provided with a loose sleeve M, upon which are rigidly mounted a pinion $m$ and a friction-roller $m'$, the pinion being of somewhat larger diameter than the aforesaid pinion $l^2$. There is also provided a member N, comprising two sections N N$^2$ of somewhat irregular construction. They are without hubs and are connected by studs $n$, preferably three in number, upon which studs are mounted loose sleeves $n'$. It may be well to state that the former comprises a cylindrical face $n^2$, while the latter comprises a cylindrical face $n^3$, integral with a conical portion, wherefore these two wheels may be said to inclose or surround, as it were, the gearing, which has been described with particularity, and between the two parts N' N$^2$ an internal gear P projects outward. Moreover, the outer faces of the two parts N' N$^2$ are in substantial alinement with the outer faces of two other wheels R and Q and the outer face of the internal gear P aforesaid, and the faces of all these parts are provided, as indicated, with lugs or projections for a purpose which will appear. Upon each of these sleeves $n'$ are rigidly secured two gears O O', the former of which meshes with the aforesaid pinion $l^2$ and the latter of which meshes with the pinion $m$, and between these gears and outside of them upon the aforesaid sleeve are mounted friction-rollers $o$, which bear, respectively, against the aforesaid friction-rollers $m'$ $l^3$ upon the inner sleeve L. The large annular ring or internal gear P is arranged concentrically with the shaft A, and it is provided with internal teeth $p$, adapted to mesh with the teeth of the aforesaid gear O, and on either side of these teeth are provided annular wearing-strips $p'$, which are in contact with the aforesaid friction-rollers. In this manner a planetary gear mechanism is produced. It should now appear that if the internal gear P were held fixed while the hub-gear $l^2$ were rotated the member N would be rotated about the axis of the shaft A, while the gears and wheels which it carries upon the studs $n$ would describe a planetary movement with respect to the shaft. It should further appear that if the member N were held fixed a rotation of the pinion $l^2$ would be transmitted from the gear O to the internal gear P, driving the latter gear in a direction opposite to that in which the pinion $l^2$ would move. By holding certain of these parts fixed in the manner described changes in the motion transmitted may be effected, as will appear.

In addition to the gear $m$ and the friction-roller $m'$ aforesaid the sleeve M has also rigidly mounted upon it the aforesaid wheel Q, and the outer extremity of the inner sleeve L has rigidly secured thereto the aforesaid wheel R.

Surrounding or inclosing the entire left portion of this mechanism is a wheel S, which comprises a cylindrical wall $s$, and on the inner side of this wall are provided a plurality of inwardly-projecting lugs $s'$. This wheel S also comprises a hub $s^2$, which is slidably mounted upon the aforesaid sleeve B, to which it is attached by a feather $s^3$, and this hub is further provided with a reduced portion $s^4$, and an opening $e'$ in the outer end wall of the gear-case E constitutes a bearing for the same. From this construction it will appear that a longitudinal movement of the gear-case E would also effect a longitudinal movement of the wheel S. This wheel S is one which in all cases and all speeds transmits the movement to the sprocket-wheel $b$, and for this reason the lugs $s'$ upon its inner wall are adapted to engage with the aforesaid lugs carried by the other parts of the gear in a manner which will be described.

The means for arresting the movement of the gears or holding them fixed in the manner described consist, substantially, of a ring T, which is arranged concentrically with the shaft A and extends around the cylindrical wall of the gear-case, lying just within the same, as indicated. Its inner wall is provided with inwardly-projecting lugs arranged in two rows $t'$ $t^2$, as will be observed. This ring T is further provided on each side with lugs $t$, which lie between the two halves of the gear-case and through which pass bolts $t^3$. The gear-case E is itself normally not rotatable, and when it is moved longitudinally in the manner which will be described the lugs $t'$ $t^2$, carried by the ring T, may be thrown into the path of certain of the lugs carried by the gears, wherefore these gears or certain ones of them will be brought to rest for the purpose described. Now it should appear that if the gear-case E were moved longitudinally into the successive positions indicated, respectively, in Figs. 6, 7, 8, and 9 the ring T and the driving-wheel S would be moved with it, and the ring T affords means for arresting the movement or fixing against relative movement any parts having lugs into the path of which the lugs of the ring should pass, while the lugs $s'$ of the driving-wheel S, coming into the path of the lugs carried on certain of the other members, would move with these members, transmitting movement to the sprocket-wheel $b$, as will be readily understood. It will be observed that lugs $n^4$ $p^2$, which are carried by the wheels N' P', project to a greater extent than do the remaining lugs upon the gear, and it should also be observed that the lugs $t'$ $t^2$, which are provided upon the ring T, project to a much less extent, and though they are adapted to engage the lugs $n^4$ $p^2$ when projecting into their path they are not adapted to engage any other lugs of the mechanism, the remaining lugs not projecting sufficiently to bring this about.

When the parts are in the relative position in which they are shown in Fig. 1, it will be observed that the lugs in the row $t'$ upon the ring T lie in the path of the lugs $n^4$, wherefore rotation of the member N will be prevented. At the same time the lugs $s'$ upon the driving-wheel S will lie in the path of the lugs $p^2$. It will be remembered that when the wheel N is held in this manner motion is transmitted to the internal gear P, wherefore the lugs $p^2$, engaging with the lugs of the driving-wheel S, will transmit a movement to the sprocket-wheel $b$, and this is the relation adapted to drive the vehicle backward.

Suppose the gear-case be moved so that the parts come into the position in which they are shown in Fig. 6. Lugs $p^2$, carried by the gear P, will then be arrested by the row of lugs $t'$. At the same time the lugs $s'$ on the driving-wheel S will have come into the path of the lugs $n^5$, carried by the member N. When this takes place, the internal gear P is held against rotation, and the wheel N receives a rotary movement, due to the planetary movement of the gears O. The angular velocity, however, with this arrangement is comparatively low, wherefore the vehicle will be driven ahead, but at a low speed.

In Fig. 7 the lugs are in such an arrangement as will bring the row of lugs $t^2$ into the path of the lugs $n^4$, wherefore the member N will be once more held against movement, while the lugs $s'$ of the driving-wheel S will come into the path of a row of lugs $q$ upon the wheel Q. This wheel, it should be observed, receives motion from the small gear O', meshing with the larger gear $m$, so that its angular velocity is reduced, wherefore the speed of the vehicle with this arrangement will also be reduced, although greater than the speed resulting from the arrangement shown in Fig. 6.

The next operative position is shown in Fig. 8, where it will appear that the internal gear P is again held fixed, driving being effected from the wheel Q by means of a second row of lugs $q'$. A planetary movement will now take place, the member N advancing, so that an angular velocity somewhat increased over the last is given to the wheel Q. In this arrangement the vehicle advances at a medium fast speed.

For producing full speed ahead the parts are thrown into the position shown in Fig. 9. In this arrangement the lugs carried by the ring T do not operate, but the lugs of the driving-wheel S pass into the path of lugs $r$, carried by the wheel R. With this arrangement evidently rotation of the sleeve L is transmitted with unreduced angular velocity to the sprocket-wheel $b$, wherefore the sprocket-wheel $b$ will be driven at the same speed as the shaft A.

The mechanism for throwing the parts into the five different positions set forth comprises a link V, attached to the gear-case E and upon the outer extremity of which is rotatably mounted a yoke or bracket $v$, provided with forks $v'$ $v^2$, between which forks is mounted a long fixed stud $v^3$. To the lever K, referred to above, is pivoted at $k$ a lever $k'$, which is provided with an opening receiving nicely the aforesaid stud $v^3$. The extremity of this lever $k'$ is formed, preferably, with a notch $k^2$, and the hub $g$ of the bracket G, described before, is provided with a plurality of ribs $g^2$, which are adapted to be engaged by the said notch $k^2$, and they correspond with the different positions for driving the vehicle, as has been described. It should be observed that these ribs are arranged upon an arc as viewed in Fig. 1, so that they may always be engaged by the notch $k^2$, while they at the same time pass circumferentially around the hub $g$ an amount substantially equal to ninety degrees. The lever $k'$ is provided with a suitable operating-handle $k^3$, which enables the arm K to be swung around irrespective of what may be the position of the lever $k'$ with reference to the ribs $g^2$. This movement is sufficient to close the friction-clutch from the fact that the thread upon the nut $f'$ is made of high pitch for this purpose. When the arm K is substantially vertical, in which position it is shown in Fig. 3, the notch $k^2$ will have passed out of engagement with any of the ribs $g^2$, and when in this position the lever $k'$ may be swung upon its pivot $k$ until the notch is brought opposite that rib corresponding to the desired speed of the vehicle, whereupon swinging the arm K again upon the axis of the hollow spindle F will bring the notch $k^2$ into engagement with the proper rib, locking the mechanism into the necessary position, as will be readily understood. It should be remembered that swinging the arm K in this manner also applies the friction-clutch, wherefore the vehicle is driven ahead.

It will be observed that the construction involving the yoke or bracket $v$ enables the connection between the lever $k'$ and the link V to be maintained always intact whatever be the angular position of the arm K, for as the arm is thrown to a different angular position the bracket $v$ rotates upon the link V, while the lower extremity of the lever $k'$ slides upon the stud $v^3$, so that it assumes another intermediate position between the forks $v'$ $v^2$ of the bracket.

In starting up gas-engines or explosion-engines it should be remembered that it is usually necessary to start them by hand, and this is generally done by means of a crank, such as that indicated by $u$. This crank is preferably formed integral with the spindle U, which is carried in the aforesaid hollow spindle F. Its inner extremity lies adjacent to the inner extremity of the reduced extension $a^3$ of the aforesaid shaft A, where it is provided with one or more laterally-projecting teeth $u'$. This spindle U is normally maintained in an outer position, as indicated, by a spring $u^2$, and the extremity of the shaft A is provided with notches $a^4$, corresponding with the teeth $u'$, said notches and projections having inclined faces on one side. From this construction if the spindle U be thrust longitudinally until the notches and projections $u'$ engage a rotation of the spindle U in the forward direction will be transmitted to the shaft A, as will be readily understood. The spindle U is arranged to have the necessary limited movement by means of a reduced portion $u^3$, which coöperates with the tip of a bolt $k^4$.

It frequently happens that in starting explosion-engines a premature explosion while the chauffeur's hand is upon the crank-handle will drive the crank backward with considerable force, an act which is popularly known as "kicking back." An arrangement is provided for disconnecting the spindle U from the shaft A in case this should happen. For this purpose the spindle U is provided with circumferentially-arranged notches or recesses $u^4$, which are deepest at one corner and provided with an abrupt face $u^5$, the bottom of the recess meeting the circumferential outer surfaces of the spindle, as indicated in Fig. 4. At a short distance behind this point the inner face of the hollow spindle F is provided with a recess $f^2$, in which is mounted a ball $f^3$, preferably of hardened steel. Now when the inner spindle U is thrust inward the notches $u^4$ will come into alinement with the ball, which may then drop into them successively. The spindle U is then rotatable in a forward direction, due to the form of the notches. However, in case of a sudden rotation of the spindle U in a reversed direction, which would occur under the circumstances described, the ball $f^3$ is then engaged by one of the abrupt faces $u^5$ and operates to bring about a rotation of the outer spindle F, which rotation, by means of the nut $f$, causes the outer spindle to be withdrawn, disconnecting the friction-clutch, as will be readily understood, and it also in its movement carries with it the inner spindle, disconnecting the same from connection with the extremity of the shaft A.

The crank-handle $u^5$ is pivoted, as indicated at $u^6$, to the extremity of the crank $u$, and its head $u^7$ is provided with two notches or recesses $u^8$, placed substantially at right angles to each other, either of which notches may engage a projection $u^9$, carried, preferably, by the extremity of the leaf-spring $u^{10}$, which is secured to the crank, as indicated. When the parts are in the relation in which they are shown in Fig. 5, the handle projects outward, as shown; but the construction enables the handle to be rotated upward on its pivot and folded, as it were, until the projection $u^9$ engages the recess $u^8$, whereupon the handle will be held in this folded position.

As to the number and arrangement of the driving-lugs of the mechanism they may be as numerous as thought advisable; but the preferred construction employs twelve upon each member, disposed, of course, an equal distance apart.

In order to prevent any rotation of the gear-case E, it is connected by a feather $e^2$ with the member D, as indicated, which latter member is provided with inwardly-projecting lugs $d^3$, which receive between them longitudinally-projecting bars $g^3$, which are rigidly secured to the hub of the bracket G.

The diameter of each of the friction-rollers should, of course, be the same as the pitch diameter of its corresponding gear.

What I claim is—

1. In a transmission mechanism, in combination, an inner gear, a member rotatable thereabout, a second gear carried thereby and meshing with the said inner gear, a speed-changing gear adapted to be driven through said second gear, an internal gear meshing with said second gear, means for arresting the advance of said member and means for transmitting the motion of said mechanism through said internal gear or through said speed-changing gear, substantially as set forth.

2. In a transmission mechanism, in combination, a central gear, a member rotatable about the same axis with said gear, planetary gears carried by said member and meshing with said central gear, an internal gear meshing with said planetary gear, a speed-changing gear driven through said planetary gears, a non-rotatable member, a rotatable member which may transmit movement from said mechanism and means for moving said non-rotatable member and said last rotatable member so that the one may engage parts of said mechanism to arrest the movement thereof and the other may engage other parts of said mechanism to transmit the movement thereof, substantially as set forth.

3. In a transmission mechanism, in combination, a central gear, a member rotatable about the axis thereof, planetary gears carried by said member and meshing with said central gear, an internal gear surrounding said planetary gears and meshing with the same, speed-changing gears driven through said planetary gears, a non-rotatable member, a rotatable member, and a member adapted to move both simultaneously and means whereby said non-rotatable member may engage different moving parts of said mechanism whereby said last rotatable member may transmit the movement of some other part of said mechanism, substantially as set forth.

4. In a transmission mechanism, in combination, a central gear, planetary mechanism, coöperating therewith, speed-changing gears driven through said planetary mechanism, a non-rotatable member, a rotatable member and means whereby said non-rotatable member may arrest the movement of a portion of said planetary mechanism, whereby said rotatable member may transmit movement from one of the remaining said parts, substantially as set forth.

5. In a transmission mechanism, in combination, a central gear, a member rotatable about the same axis therewith, planetary gears carried thereby and meshing with said central gear, an internal gear meshing with said planetary gears, a second central gear, means for driving the same through said planetary gears, a non-rotatable member, a rotatable member, means for moving said last two members so that the first may arrest the movement of said first rotatable member or said internal gear, and means whereby the other and rotatable member may transmit the movement of said first rotatable member, said internal gear or said second central gear, substantially as set forth.

6. In a transmission mechanism, in combination, a central sleeve, a gear rigidly mounted thereupon, a rotatable member upon the same axis therewith, planetary gears carried thereby and meshing with said central gear, an internal gear with which said planetary gears mesh, a second central gear driven through said planetary gears, and loosely mounted upon said central sleeve, a member rigid with said central gear, a member rigid with said first central sleeve, means for arresting the movement of said first rotatable member or said internal gear, and means for transmitting respectively the movements of said first rotatable member said internal gear and said last two members, substantially as set forth.

7. In a transmission mechanism, in combination, a clutch, speed-changing mechanism, an arm constituting a lever and adapted to operate said clutch, a lever pivoted to said arm, means for locking said lever in a plurality of positions with respect to said arm, and mechanism connecting said lever with said speed-changing mechanism, substantially as set forth.

8. In a transmission mechanism, in combination, speed-changing mechanism, a clutch, an arm adapted to rotate to apply said clutch, a lever pivoted thereto and adapted to move it in a plane substantially at right angles to the plane in which said arm moves, a fixed member adjacent to said lever, means whereby said lever may engage with said fixed member in a plurality of positions and mechanism connecting said lever with said speed-changing mechanism, substantially as set forth.

9. In a transmission mechanism, in combination, speed-changing mechanism, a clutch, a spindle adapted to operate said clutch, an arm adapted to rotate said spindle, a lever carried by said arm, means whereby said lever may control said speed-changing mechanism, a bracket constituting a support for said spindle and means whereby said bracket may engage said lever in a plurality of positions, substantially as set forth.

10. In a transmission mechanism, in combination, speed-changing mechanism, a clutch, a rotatable arm adapted to apply said clutch, a lever carried thereby and adapted to control said speed-changing mechanism, a fixed member, said lever being adapted to engage said fixed member in a plurality of positions when said arm is rotated, substantially as set forth.

11. In a transmission mechanism, in combination, speed-changing mechanism, a clutch, a spindle, an arm rigid therewith and adapted to control said clutch, a lever carried by said arm, a bracket constituting a support for said spindle and having a hub provided with circumferential ribs which may engage said lever, and means whereby said lever may lie normally out of engagement with said ribs, substantially as set forth.

12. In a transmission mechanism, in combination, speed-changing mechanism, a clutch, a spindle, an arm rigid therewith and adapted to apply said clutch, a lever carried by said arm, said lever being adapted to swing in a plane substantially parallel with the axis of said spindle, a bracket constituting a support for said spindle, said bracket having circumferentially-disposed projections, means whereby said lever may engage therewith when said arm rotates, and mechanism connecting said lever with said speed-changing mechanism, substantially as set forth.

13. In a transmission mechanism, in combination, speed-changing mechanism, a clutch, a spindle, a nut carried by said spindle whereby a rotation of said spindle may apply said clutch, an arm rigid with said spindle, a lever carried by said arm and adapted to control said speed-changing mechanism and means whereby the rotation of said arm may lock said lever in a fixed position with respect to the pivot thereof, substantially as set forth.

14. In a transmission mechanism, in combination, speed-changing mechanism, a clutch, a rotatable arm adapted to apply said clutch, a lever carried by said arm and adapted to swing in a plane substantially at right angles to the plane of rotation of said arm, a link through which said lever may control said speed-changing mechanism, a bracket rotatably mounted upon said link, means whereby said bracket may engage said lever, means whereby said lever may move laterally with respect to said bracket while maintaining engagement therewith, substantially as set forth.

15. In a transmission mechanism, in combination, a driving-gear, planetary mechanism driven therethrough, a clutch, a member adapted to control said clutch, a lever carried by said member, means whereby said lever may arrest the motion of different parts of said planetary mechanism, and means for transmitting the motion of different parts of said mechanism, substantially as set forth.

16. In a transmission mechanism, in combination, a driving-gear, planetary mechanism driven therethrough, a speed-changing gear also driven through said driving-gear, a clutch, a member adapted to operate said clutch, a lever carried by said member, means whereby said lever may arrest the movement of certain parts of said mechanism and means for transmitting the movement of certain parts of said mechanism, substantially as set forth.

17. In a transmission mechanism, in combination, a driving-gear, planetary mechanism driven therethrough, a speed-changing gear driven through said planetary mechanism, a rotatable member which may engage parts of said mechanism, a non-rotatable member which may engage parts of said mechanism, a lever adapted to apply said last two members, a third member carrying said lever and a clutch controlled by said third member, substantially as set forth.

18. In a transmission mechanism, in combination, a driving-gear, planetary mechanism driven therethrough, a speed-changing gear driven through said planetary mechanism, a clutch, a rotatable arm adapted to operate said clutch, a non-rotatable member, a rotatable member which last two members may engage parts of said mechanism, and a lever adapted to control said last two members and pivoted to said arm, substantially as set forth.

19. In a transmission mechanism, in combination, a driving-gear, planetary gears driven therethrough, friction-rollers coaxial with said gears and adapted to roll upon each other, a speed-changing gear driven through said gears, means for arresting the advance of different parts of said mechanism and means for transmitting the movement of differents parts of said mechanism, substantially as set forth.

20. In a transmission mechanism, in combination, a central driving-gear, planetary gears driven therethrough, an internal gear surrounding said planetary gears and meshing with the same, friction-rollers coaxial with said gears, said rollers being adapted to roll upon each other, certain of said rollers being adapted to bear against the face of said internal gear, a speed-changing gear driven through said planetary gears, means for arresting the advance of different parts of said mechanism, and means for transmitting the motion of different parts of said mechanism, substantially as set forth.

21. In a transmission mechanism, in combination, a central driving-gear, planetary gears driven therethrough, an internal gear surrounding said planetary gears and meshing with the same, friction-rollers coaxial with said gears, said rollers being adapted to roll upon each other, certain of said rollers being adapted to bear against the face of said internal gear, a third gear driven through said planetary gears, means for arresting the advance of different parts of said mechanism, means for transmitting the motion of different parts of said mechanism, and means for simultaneously operating said last two means, substantially as set forth.

In testimony whereof I affix my signature in presence of two witnesses.

EMIL A. NELSON.

Witnesses:
F. D. AMMEN,
E. L. PARDEE.